United States Patent [19]
Furukoori

[11] Patent Number: 4,817,173
[45] Date of Patent: Mar. 28, 1989

[54] IMAGE CONTOUR DETECTING APPARATUS
[75] Inventor: Hitoshi Furukoori, Tokyo, Japan
[73] Assignee: Kabushiki Kaisha Meidensha, Tokyo, Japan
[21] Appl. No.: 168,372
[22] Filed: Mar. 15, 1988
[30] Foreign Application Priority Data
  Mar. 16, 1987 [JP] Japan .................................. 62-60744
  Jun. 29, 1987 [JP] Japan ................................ 62-161945
[51] Int. Cl.$^4$ ............................................... G06K 9/48
[52] U.S. Cl. .......................................... 382/21; 382/60
[58] Field of Search ............................... 382/21, 22, 60
[56]       References Cited
       U.S. PATENT DOCUMENTS
  4,524,454  6/1985  Ejiri ....................................... 382/21
  4,630,306 12/1986  West et al. ............................ 382/21
  4,703,512 10/1987  Saka et al. ............................. 382/22

Primary Examiner—Leo H. Boudreau
Assistant Examiner—Yonnie Jung
Attorney, Agent, or Firm—Bachman & LaPointe

[57]       ABSTRACT

An apparatus for detecting one or more contours of an image formed on a screen. The apparatus comprises a scanner for raster scanning pixels located on scan lines extending in paralllel with each other in the X direction of a two-dimensional coordinate system to successively produce binary pixel data regarding the scanned pixels. The binary pixel data have a first value representing a background forming pixel or a second value representing an object forming pixel. The binary pixel data are transferred to a pixel data matrix stored therein. The pixel data matrix includes pixel data regarding two adjacent pixels located on the next scan line. The latter two adjacent pixels are respectively adjacent to the former two adjacent pixels in the Y direction of the two-dimentional coordinate system. The apparatus also comprises a processing circuit which receives the pixel data matrix transferred thereto from the pixel data matrix forming circuit for producing data indicating the image contour(s).

8 Claims, 9 Drawing Sheets

| NO | INPUT | | | | OUTPUT | | | |
|----|---|---|---|---|----|----|----|----|
|    | a | b | c | d | a' | b' | c' | d' |
| 0  | 0 | 0 | 0 | 0 | 0 | 0 | 0 | 0 |
| 1  | 0 | 0 | 0 | 1 | 0 | 0 | 0 | 0 |
| 2  | 0 | 0 | 1 | 0 | 0 | 0 | 0 | 0 |
| 3  | 0 | 0 | 1 | 1 | 0 | 0 | 1 | 1 |
| 4  | 0 | 1 | 0 | 0 | 0 | 0 | 0 | 0 |
| 5  | 0 | 1 | 0 | 1 | 0 | 1 | 0 | 1 |
| 6  | 0 | 1 | 1 | 0 | 0 | 0 | 0 | 0 |
| 7  | 0 | 1 | 1 | 1 | 0 | 1 | 1 | 1 |
| 8  | 1 | 0 | 0 | 0 | 0 | 0 | 0 | 0 |
| 9  | 1 | 0 | 0 | 1 | 0 | 0 | 0 | 0 |
| 10 | 1 | 0 | 1 | 0 | 1 | 0 | 1 | 0 |
| 11 | 1 | 0 | 1 | 1 | 1 | 0 | 1 | 1 |
| 12 | 1 | 1 | 0 | 0 | 1 | 1 | 0 | 0 |
| 13 | 1 | 1 | 0 | 1 | 1 | 1 | 0 | 1 |
| 14 | 1 | 1 | 1 | 0 | 1 | 1 | 1 | 0 |
| 15 | 1 | 1 | 1 | 1 | 0 | 0 | 0 | 0 |

FIG.4

| NO | INPUT | | | | OUTPUT | | | |
|----|---|---|---|---|----|----|----|----|
|    | a | b | c | d | a' | b' | c' | d' |
| 0  | 0 | 0 | 0 | 0 | 0 | 0 | 0 | 0 |
| 1  | 0 | 0 | 0 | 1 | 0 | 0 | 0 | 0 |
| 2  | 0 | 0 | 1 | 0 | 0 | 0 | 0 | 0 |
| 3  | 0 | 0 | 1 | 1 | 0 | 0 | 1 | 1 |
| 4  | 0 | 1 | 0 | 0 | 0 | 0 | 0 | 0 |
| 5  | 0 | 1 | 0 | 1 | 0 | 1 | 0 | 1 |
| 6  | 0 | 1 | 1 | 0 | 0 | 1 | 1 | 0 |
| 7  | 0 | 1 | 1 | 1 | 0 | 1 | 1 | 0 |
| 8  | 1 | 0 | 0 | 0 | 0 | 0 | 0 | 0 |
| 9  | 1 | 0 | 0 | 1 | 1 | 0 | 0 | 1 |
| 10 | 1 | 0 | 1 | 0 | 1 | 0 | 1 | 0 |
| 11 | 1 | 0 | 1 | 1 | 1 | 0 | 0 | 1 |
| 12 | 1 | 1 | 0 | 0 | 1 | 1 | 0 | 0 |
| 13 | 1 | 1 | 0 | 1 | 1 | 0 | 0 | 1 |
| 14 | 1 | 1 | 1 | 0 | 0 | 1 | 1 | 0 |
| 15 | 1 | 1 | 1 | 1 | 0 | 0 | 0 | 0 |

| d4 (P(xl-1, yl-1)) | d3 (P(xl, yl-1)) |
|---|---|
| d2 (P(xl-1, yl)) | d1 (P(xl, yl)) |

FIG.10

| R(xl-1) | R(xl) |
|---|---|
| T(xl-1) | T(xl) |

IMAGE CONTOUR DETECTING APPARATUS

BACKGROUND OF THE INVENTION

This invention relates to an apparatus for detecting one or more contours of an image formed on a screen.

Contour following apparatus have been proposed in the art for detecting an image contour. An image on a screen can be entered into an contour following apparatus by means of a scanner. The scanner scans pixels on the screen and produces pixel data each time it scans a pixel. The pixel data regarding the scanned pixels are successively stored in a memory to form a secondary image. The contour following apparatus extracts pixels which form the image contour and follows the contour forming pixels one by one based on the secondary image. One difficulty associated with such a conventional contour following apparatus is that the used memory should have a great number of memory sections for storing pixel data in number equal to the number of the pixels located on the screen.

SUMMARY OF THE INVENTION

It is a main object of the invention to provide an image contour detecting apparatus which can reduce the number of necessary memory sections to a remarkable extent.

Another object of the invention is to provide an image contour detecting apparatus which can perform contour following processes at a higher speed.

There is provided, in accordance with the invention, an apparatus for detecting one or more contours of an image formed on a screen. The apparatus comprises means for raster scanning pixels located on scan lines extending in parallel with each other in the X direction of a two-dimentional coordinate system to successively produce binary pixel data regarding the scanned pixels. The binary data have a first value representing a background forming pixel or a second value representing an object forming pixel. A pixel data matrix forming circuit successively receives the binary pixel data for forming a pixel data matrix stored therein. The pixel data matrix includes pixel data regarding two adjacent pixels located on a scan line and pixel data regarding two adjacent pixels located on the next scan line. The latter two adjacent pixels are respectively adjacent to the former two adjacent pixels in the Y direction of the two-dimensional coordinate system. A processing circuit receives the pixel data matrix transferred from the pixel data matrix forming circuit for producing data indicating the image contour(s).

In one aspect of the invention, the processing circuit includes a flag data matrix forming circuit successively receiving binary front flag data and binary rear flag data for forming a flag data matrix stored therein, the flag data matrix including front flag data regarding the former two adjacent pixels and rear flag data regarding the latter two adjacent pixels, the front binary data having a first value representing a decided connection of the corresponding pixel to a following contour forming pixel or a second value representing an undecided connection of the corresponding pixel to a following contour forming pixel, the rear flag data having a first value representing a decided connection of the corresponding pixel to a preceding contour forming pixel and a second value representing an undecided connection of the corresponding pixel to a preceding contour forming pixel; a flag updating circuit receiving the pixel data matrix transferred thereto from the pixel data matrix forming circuit and the flag data matrix transferred thereto from the flag data forming circuit for detecting preceding and new contour forming pixels included in the transferred pixel data matrix, the flag data matrix forming circuit including means for deciding a connection of the preceding contour forming pixel to the new contour forming pixel, the flag updating circuit including means for updating the flag data matrix according to the decided connection, the flag updating circuit including means for transferring the updated flag data matrix to the flag data matrix forming circuit; a command generating circuit receiving the pixel data matrix transferred thereto from the pixel data matrix forming circuit and the flag data matrix transferred thereto from the flag data matrix forming circuit for producing command data, the command generating circuit having a relationship programmed thereinto, the relationship defining the command data as a function of pixel data matrix and flag data matrix; and means responsive to the command data transferred thereto from the command generating circuit for connecting the contour forming pixels.

In another aspect of the invention, the processing circuit includes a decision circuit responsive to the pixel data matrix transferred thereto from the pixel data forming circuit for producing an output data matrix. The output data matrix is the same as the transferred pixel data matrix when the transferred pixel data matrix is a 4- or 8-connectedness pixel data matrix. The output data matrix has output data each having the first value when the transferred pixel data matrix is not a 4- or 8-connectedness pixel data matrix. The processing circuit also includes an editing circuit receiving the output data matrix transferred thereto from the decision circuit for producing contour pixel data having the output data arranged in the order where the respective pixels are scanned.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

DETAILED DESCRIPTION OF THE INVENTION

Figure 1:
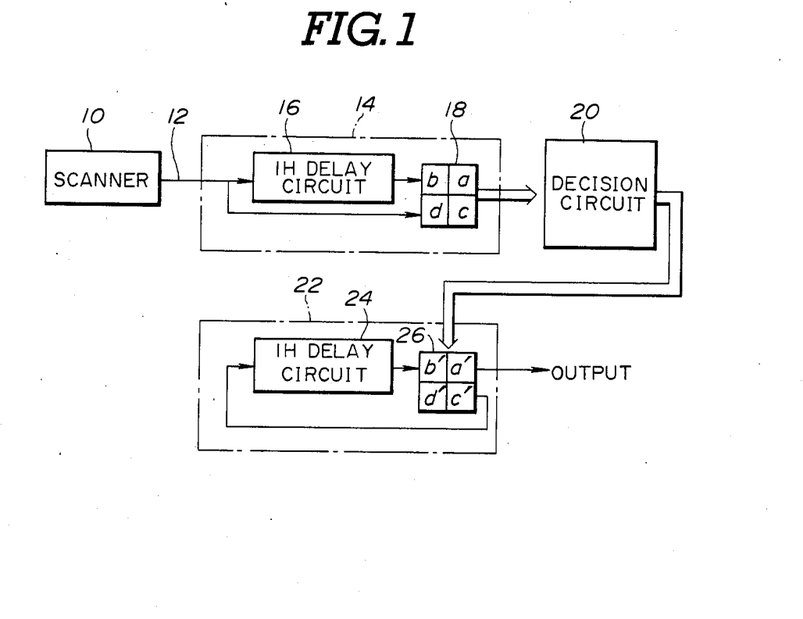
FIG. 1 is a schematic block diagram showing one embodiment of an image contour detecting apparatus made in accordance with the invention.

With reference to the drawings, where like numerals refer to like parts in the several views, and in particular to FIG. 1, there is a schematic illustration of an image contour detecting apparatus embodying the invention. Image information on a screen can be entered into the image contour detecting apparatus by means of a scanner 10. The image is comprised of picture elements (or pixels) placed on the screen in a Cartesian coordinate system having a horizontal (X) and vertical (Y) axis. These pixels are represented as coordinate pairs; e.g., x1, y1; x2, y2; x3, y3; etc. the scanner 10 may, for example, comprise a raster scanner and digitizer. The raster scanner scans an electron beam across the surface of the screen in such a manner as indicated by the solid arrows of FIG. 2, to successively sense the light intensities of the respective pixels on the screen. The digitizer compares the light intensity of each of the scanned pixels with one or more threshold values to produce binary pixel data. The pixels include object forming pixels which form the object(s) on the screen and background forming pixels which form the background on the screen. A pixel (x, y)=1 represents an object forming pixel, while a pixel (x, y)=0 represents a background forming pixel. For simplicity, description will be made on an assumed that the image is black and white. A black/white image can be represented by assigning a value of 1 or 0 to each pixel P(x, y). Thus, P(x, y)=1 represents a black pixel, while P(x, y)=0 represents a white pixel.

The binary pixel data signal is supplied from the scanner 10 through a data line 12 to a pixel data matrix forming circuit 14. The pixel data matrix forming circuit 14 includes a memory 18 having four 1-bit memory sections. The memory 18 may be taken in the form of a shift register matrix consisting of a first bank including front and rear shift registers connected in series with each other and a second bank including front and rear shift registers connected in series with each other. The first bank front shift register has an input connected directly to the data line 12, while the second bank front shift register has an input connected through a 1H delay circuit 16 to the data line 12. The 1H delay circuit 16 delays application of the binary pixel data signal to the second bank front shift register a time period equal to one horizontal scanning interval.

Figure 2:
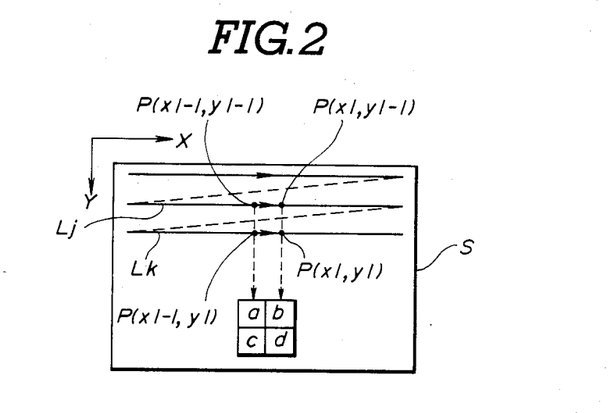
FIG. 2 is a diagram showing a raster scanning process used in entering pixel data into the apparatus.

Assuming now that the scanner 10 scans a new pixel P(x1, y1) and produces binary pixel data regarding the pixel P(x1, y1), the binary pixel data signal is applied directly to the memory 18 so that the value d of the pixel P(x1, y1) is stored in the front register of the first bank and the value c of the last pixel P(x1-1, y1) is shifted to the rear shift register of the first bank. At this time, the 1H delay circuit 16 produces binary pixel data regarding a pixel P(x1, y1-1). The value b of the pixel P(x1, y1-1) is stored in the front register of the second bank and the value a of the pixel P(x1-1, y1-1) is shifted to the rear shift register of the second bank. This condition is shown in Fig. 1. Thus, the memory 18 stores a pixel data matrix having 4-bit pixel data regarding two horizontally adjacent pixels P(x1, y1) and P(x1-1, y1) located on a new scan line Lk and two horizontally adjacent pixels P(x1, y1-1) and P(x1-1, y1-1) located on the last scan line Lj, the latter two pixels P(x1, y1-1) and P(x1-1, y1-1) being adjacent vertically to the former two pixels P(x1, y1) and P(x1-1, y1), respectively, as shown in FIG. 2.

It is to be noted that a pixel data matrix which contains pixel data regarding one pair of black pixels adjacent vertically or horizontally to each other or which contains pixel data regarding one pair of black pixels adjacent horizontally to each other and pixel data regarding another pair of black pixels adjacent vertically to each other will be referred through this invention to as "a 4-connectedness pixel data matrix" except for a pixel data matrix having pixel data regarding four black pixels. In addition, a pixel data matrix which contains pixel data regarding one pair of black pixels adjacent horizontally or vertically to each other, or which contains pixel data regarding one pair of black pixels adjacent horizontally to each other and another pair of black pixels adjacent vertically to each other, or which contains pixel data regarding one pair of black pixels adjacent diagonally to each other will be referred through this invention to as "an 8-connectedness pixel data matrix" except for a pixel data matrix containing pixel data regarding four black pixels.

The 4-bit pixel data stored in the memory 18 are transferred to a decision circuit 20 in synchronism with the operation of the scanner 10; e.g., each time the scanner 10 scans a new pixel and produces binary pixel data regarding the new pixel to the pixel data matrix forming circuit 14. The decision circuit 20 has a relationship programmed thereinto. This relationship defines 4-bit output data as a function of 4-bit input data for converting the transferred 4-bit pixel data into proper 4-bit output data according to the fact that the transferred pixel data form a 4-connectedness of 8-connectedness pixel data matrix.

Figure 3:
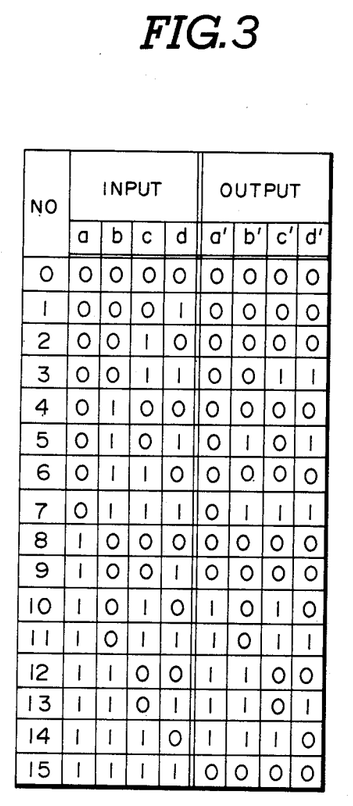
FIG. 3 is a table showing one example of the relationship programmed in the decision circuit of FIG. 1.

FIG. 3 shows the relationship between the 4-bit pixel data transferred to the decision circuit 20 from the memory 18 and the 4-bit output data produced from the decision circuit 20. In this case, the decision circuit 20 produces 4-bit output data which are the same as the transferred 4-bit pixel data when the transferred 4-bit pixel data form a 4-connectedness pixel data matrix such as pixel data No. 3, No. 5, No. 7, No. 10, No. 11., No. 12, No. 13 or No. 14. Otherwise, the decision circuit 20 outputs 4-bit data "0000".

Figure 4:
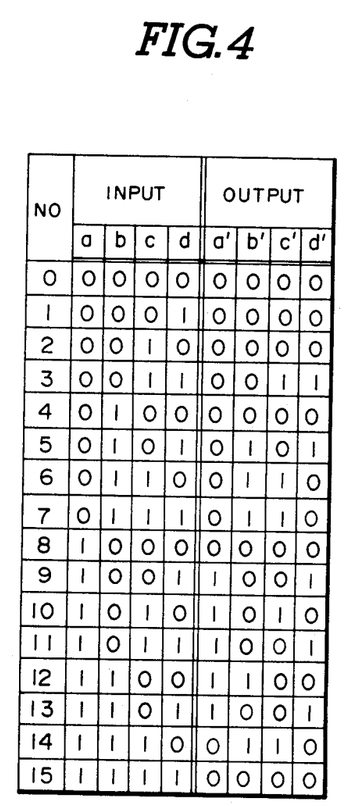
FIG. 4 is a table showing another example of the relationship programmed into the decision circuit of FIG. 1.

FIG. 4 shows the relationship between the 4-bit pixel data transferred to the decision circuit 20 from the memory 18 and the 4-bit output data produced from the decision circuit 20. In this case, the decision circuit 20 produces 4-bit output data according to the fact whether the transferred 4-bit pixel data form an 8-connectedness pixel data matrix such as pixel data No. 3, No. 5, No. 6, No. 7, No. 9, No. 10, No. 11, No. 12, No.

13 or No. 14. When the transferred 4-bit pixel data form an 8-connectedness pixel data matrix such as pixel data No. 3, No. 5, No. 6, No. 9, No. 10 or No. 12, the decision circuit 20 produces 4-bit pixel data which are the same as the transferred 4-bit pixel data. When the transferred 4-bit pixel data form an 8-connectedness pixel data matrix such as pixel data No. 7, No. 11, No. 13, or No. 14, the decision circuit 20 produces 4-bit pixel data which are the same as the transferred 4-bit pixel data except for a value of the pixel which is decided, from the adjacent 4-bit pixel data matrices, as a pixel not forming the contour of the image. The pixel data No. 7 show an example where the decision circuit 20 decides that the pixel having a value d forms no part of the contour of the image and produces a value d' changed from 1 to 0. The pixel data No. 11 show an example where the decision circuit 20 decides that the pixel having a value c forms no part of the contour of the image and produces a value c' changed from 1 to 0. The pixel data No. 13 show an example where the decision circuit 20 decides that the pixel having a value b forms no part of the contour of the image and produces a value b' changed from 1 to 0. The pixel data No. 14 show an example where the decision circuit 20 decides that the pixel having a value a forms no part of the contour of the image and produces a value a' changed from 1 to 0. Otherwise, the decision circuit 20 outputs 4-bit data "0000".

Figure 5:
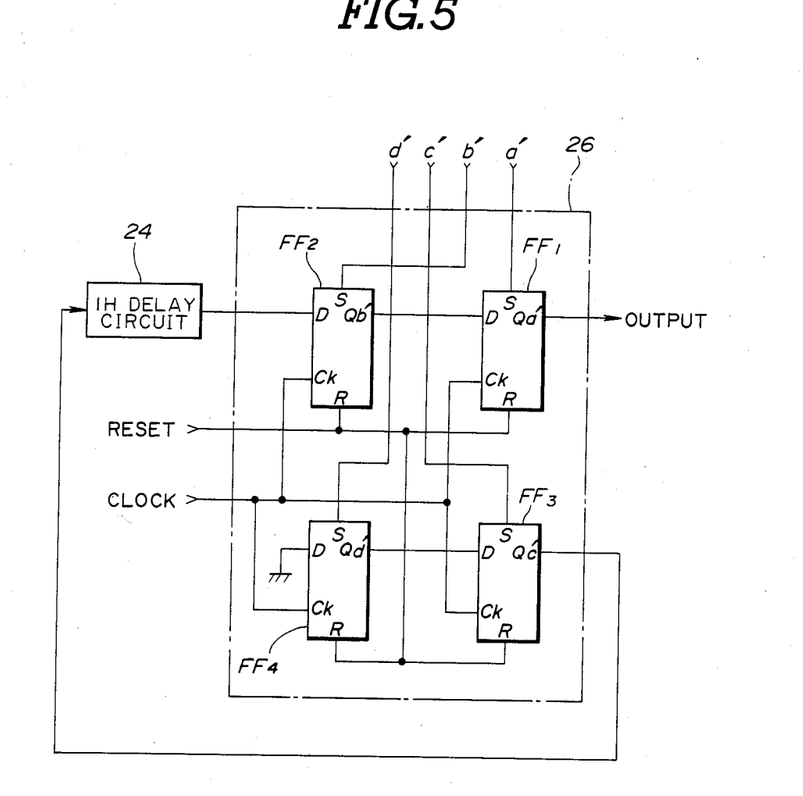
FIG. 5 is a circuit diagram showing the memory included in the editing circuit of FIG. 1.

The image contour detecting apparatus also includes an editing circuit 22 connected to the decision circuit 20. The editing circuit 22 includes a memory 26 having four 1-bit memory sections to which the 4-bit output data are transferred from the decision circuit 20. For example, the memory 26 may be taken in the form of a shift register matrix consisting of four shift registers each comprising an R-S flip-flop circuit, as shown in FIG. 5. The shift register matrix includes a first bank including front and rear shift registers FF4 and FF3 connected in series with each other and a second bank including front and rear shift registers FF2 and FF1 connected in series with each other. The first bank rear shift register FF3 has an output connected to a 1H delay circuit 24. The second bank front shift register FF2 has an input connected through the 1H delay circuit 24 to the output of the first bank rear shift register FF3. The second bank rear shift register FF1 has an output connected to a memory or display unit (not shown). The 1H delay circuit 24 delays application of the signal from the first bank rear shift register FF3 to the second bank front shift register FF2 a time period equal to one horizontal scanning interval. The shift register matrix operates on bit clock pulses generated in synchronism with the operation of the scanner 10. Thus, the editing circuit 22 produce a series of contour pixel data having a value 1 or 0 in the order or sequence where the scanner 10 scans the respective pixels. Contour pixel data having a value of 1 represent a pixel forming a part of the contour of the image.

Figure 6A:
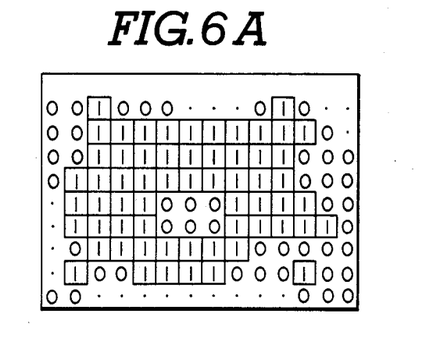
FIGS. 6A, 6B and 6C are diagrams used in explaining the operation of the image contour detecting apparatus of FIG. 1.
Figure 6B:
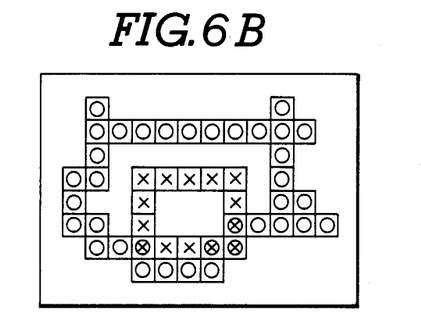
Figure 6C:
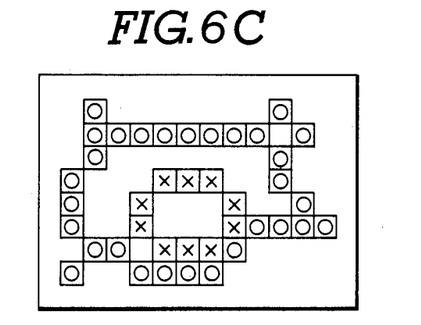

Assuming now that the scanner 10 produces binary pixel data, as shown in FIG. 6A, the editing circuit 22 produces contour pixel data, as shown in FIG. 6B, when the decision circuit 20 is arranged to operate in response to 4-connectedness pixel data matrixes. In FIG. 6B, the symbols o, x and ⊙ indicate contour pixel data having a value of 1. The symbol o indicates contour pixel data representing pixels forming the outer contour of the image, the symbol x indicates contour image data representing the pixels forming the inner contour of the image, and the symbol indicates contour pixel data representing pixels located commonly on the inner and outer contours of the image. When the decision circuit 20 is arranged to operate in response to 8-connectedness pixel data matrixes, the editing circuit 22 produces contour pixel data as shown in FIG. 6C. In FIG. 6C, the symbols o and x indicate contour pixel data having a value of 1. The symbol ⊙ indicates contour pixel data representing pixels forming the outer contour of the image, and the symbol x indicates contour pixel data representing pixels forming the inner contour of the image.

Figure 7:
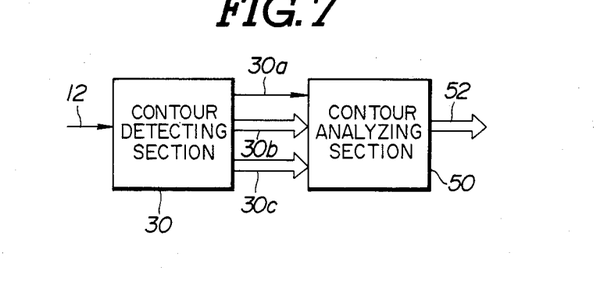
FIG. 7 is a schematic block diagram showing a second embodiment of the image contour detecting apparatus of the invention.

Referring to FIG. 7, there is illustrated a second embodiment of the image contour detecting apparatus of the invention. In this embodiment, the image contour detecting apparatus includes a contour detecting section generally designated by the numeral 30. The contour detecting section 30 has an input connected through the data line 12 to the scanner 10 (FIG. 1). The contour detecting section 30 includes a pixel data forming circuit for forming a pixel data matrix from pixel data fed thereto from the scanner. The contour detecting section 30 also includes a flag data matrix forming circuit which forms a flag data matrix indicating the course of the contour following process. The contour detecting section 30 produces command data from a relationship programmed thereinto. The relationship defines the command data as a function of pixel data matrix and flag data matrix. The command data are transferred to a contour analyzing section 50 which thereby provides one or more sequences of the contour forming pixels for forming the image contour.

Figure 8:
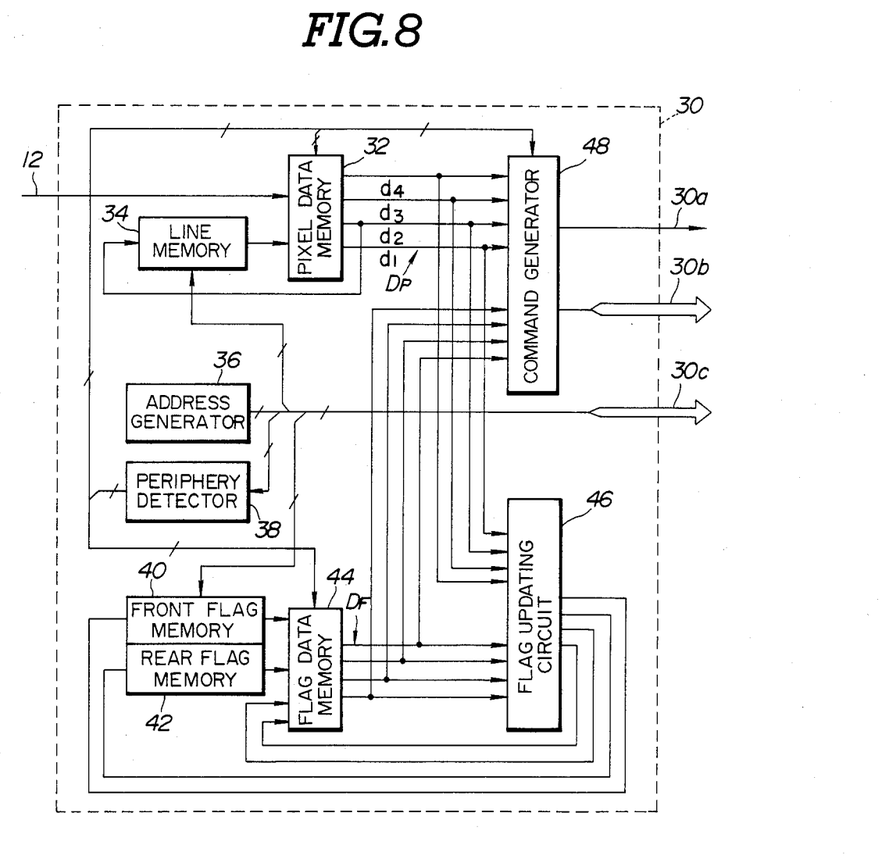
FIG. 8 is a block diagram showing the contour detecting section of the image contour detecting apparatus of FIG. 7.
Figure 9:
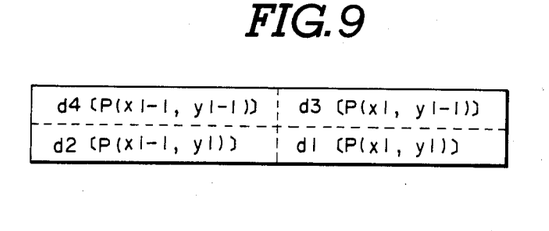
FIG. 9 is a diagram showing a pixel data matrix stored in the pixel data memory of FIG. 8.

Referring to FIG. 8, the contour detecting section 30 includes a pixel data memory 32 having four 1-bit memory sections. The pixel data memory 32 may be taken in the form of a shift register matrix consisting of a first bank including front and rear shift registers connected in series with each other and a second bank including front and rear shift registers connected in series with each other. The first bank front shift register has an input connected to the data line 12 and the first bank rear shift register has an output connected to a line memory 34. The line memory 34 has memory sections for storing pixel data regarding successive pixels in number equal to the number of pixels located on a scan line. The second bank front shift register has an input connected to the line memory 34. The line memory 34 feeds pixel data to the front shift register of the second bank according to address data fed thereto from an address generator circuit 36. The address generator circuit 36 produces address data (x, y) in synchronism with the operation of the scanner 10 (FIG. 1). The address data correspond to the coordinates (x, y) of the newly scanned pixel. The line memory 34 successively feeds pixel data regarding the pixel assigned by the x component of the address data (x, y). In other words, the line memory 34 feeds pixel data regarding the pixel P(x1, y1-1) assuming now that the now pixel is P(x1, y1). Thus, the pixel data memory 32 stores a pixel data matrix $D_P$ having pizel data d1 and d2 regarding two horizontally adjacent pixels P(x1, y1) and P(x1-1, y1) located on a new scan line and pixel data d3 and d4 regarding two horizontally adjacent pixels P(x1, y1-1) and P(x1-1, y1-1) located on the last scan line, the latter two pixels P(x1, y1-1) and P(x1-1, y1-1) being adjacent vertically to the former two pixels P(x1, Y1) and P(x1-1, y1), respectively, as shown in Fig. 9.

The contour detecting section 30 also includes a flag data matrix forming circuit which includes front and rear flag memories 40 and 42 and a flag data memory 44. The front flag memory 40, which may be substantially the same as the line memory 34, has memory sections for storing front flag data in number equal to or greater than the number of the pixels forming one scan line segment. The front flag memory 40 operates, according to the address data fed thereto from the address generator circuit 36, for storing front flag data fed thereto from a flag updating circuit 46 and supplying front flag data to the flag data memory 44. A value of 1 or 0 is assigned to front flag data R(x) regarding a contour forming pixel (x, y) as a result of a contour following process following pixels forming the contur of the image. For example, R(x)=1 indicates that the connection of a contour forming pixel to the following contour forming pixel is not decided and R(x)=0 indicates that the connection of a contour forming pixel to the following contour forming pixel is decided.

The rear flag memory 42, which may be substantially the same as the line memory 34, has memory sections for storing rear flag data in number equal to or greater than the number of the pixels forming one scan line segment. The rear flag memory 42 operates, according to the address data fed thereto from the address generator circuit 36, for storing rear flag data fed thereto from the flag updating circuit 46 and supplying rear flag data to the flag data memory 44. A value of 1 or 0 is assigned to rear flag data T(x) regarding a contour forming pixel (x, y) as a result of a contour following process following pixels forming the contour of the image. For example, T(x)=1 indicates that the connection of a contour forming pixel to the preceding contour formign pixel is not decided and T(x)=0 indicates that the connection of a contour forming pixel to the preceding contour forming pixel is decided.

Figure 10:
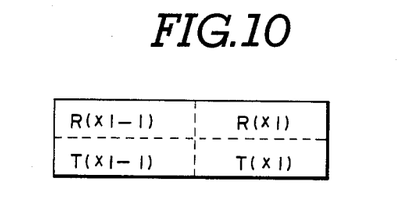
FIG. 10 is a diagram showing a flag data matrix stored in the flag data memory of FIG. 8.

The flag data memory 44 has four 1-bit memory sections for storing front and rear flag data R(x1-1) and T(x1-1) transferred thereto from the flag updating circuit 46 and front and rear flag data R(x1) and T(x1) transferred thereto from the front and rear flag memories 40 and 42, respectively. Thus, the flag data memory 44 stores a flag data matrix $D_F$, as shown in FIG. 10, which forms connection data indicating whether or not the connection of the contour forming pixel included in the corresponding pixel data matrix to the following and/or preceding contour forming pixel. The flag data matrix is transferred from the flag data memory 44 to the flag updating circuit 46 and also to a command generator circuit 48.

The flag updating circuit 46 receives a pixel data matrix $D_P$ transferred thereto from the pixel data memory 32 and a flag data matrix $D_F$ transferred thereto from the flag data memory 44 for detecting preceding and new contour forming pixels included in the transferred pixel data matrix $D_P$ and deciding the connection of the preceding contour forming pixel to the new contour forming pixel. The flag updating circuit 46 changes or updates the transferred flag data matrix $D_F$ according to the decided connection.

Figure 11:
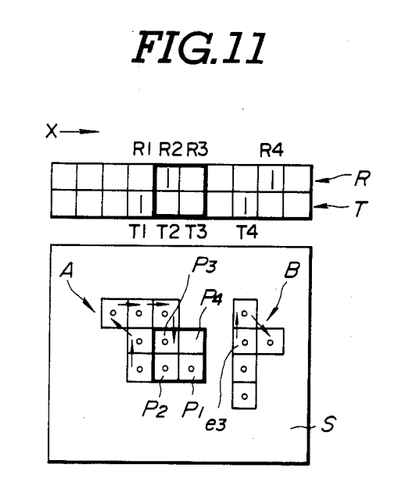
FIGS. 11 and 12 are diagrams used in explaining the operation of the flag updating circuit of FIG. 8.

It is now assumed that the contour following process is performed for the pixels P(x1, y1), P(x1-1, y1), P(x1, y1-1) and P(x1-1, y1-1). The pixel data memory 32 transfers a pixel data matrix $D_P$ including pixel data d1, d2, d3 and d4, as shown in FIG. 9, to the flag updating circuit 46 and also to the command generator circuit 48. The transferred pixel data matrix $D_P$ is shown by a bold square in FIG. 11. At this time, the flag data memory 44, which have stored a flag data matrix $D_F$ formed by the front and rear flag data R2 and T2 transferred from the flag updating circuit 46, the front flag flag data R3 transferred from the front flag memory 40, and the rear flag data T3 transferred from the rear flag memory 42, transfers this flag data matrix $D_F$ to the flag updating circuit 46. The transferred flag data matrix $D_F$ is shown by a bold square in FIG. . 11.

Figure 12:
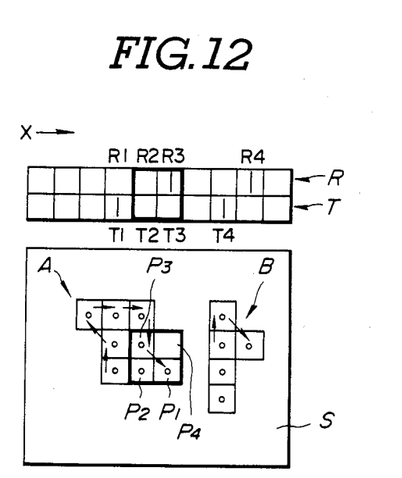

The flag updating circuit 46 detects preceding and new contour forming pixels included in the transferred pixel data matrix and decides the connection of the preceding contour forming pixel P3 to the new contour forming pixel P1, as indicated by an arrow in FIG. 12. Accordingly, the flag updating circuit 46 changes the front flag data R2 from "1" to "9" indicating that the connection of the following contour forming pixel P3 to the new contour forming pixel P1 is decided and it changes the front flag data R3 from "0" to "1" indicating that the connection of the pixel P1 to the following contour forming pixel is not decided. The flag updating circuit 46 transfers the front flag data R2 having a value of 0 to the front flag memory 40 and the rear flag data T2 having a value of 0 to the rear flag memory 42. The flag updating circuit 46 transfers the front flag data R3 having a value of1 and the rear flag data T3 having a value of 0 to the flag data memory 44. The flag updating circuit 46 newly generates a contour forming pixel when the transferred pixel data matrix has no proceding contour forming pixel.

The command generator circuit 48 receives the pixel data matrix $D_P$ transferred thereto from the pixel data memory 32 and also receives the flag data matrix $D_F$ transferred thereto from the flag data memory 44 for generating a command signal to the contour analyzing section 50 (FIG. 7). The command generator circuit 48 determines whether or not the contour analyzing section 50 is required to perform a process for connecting or provides the sequence of the contour forming pixels from a relationship programmed thereinto. This relationship define the command signal as a function of pixel data matrix $D_P$ and flag data matrix $D_F$.

Figure 13:
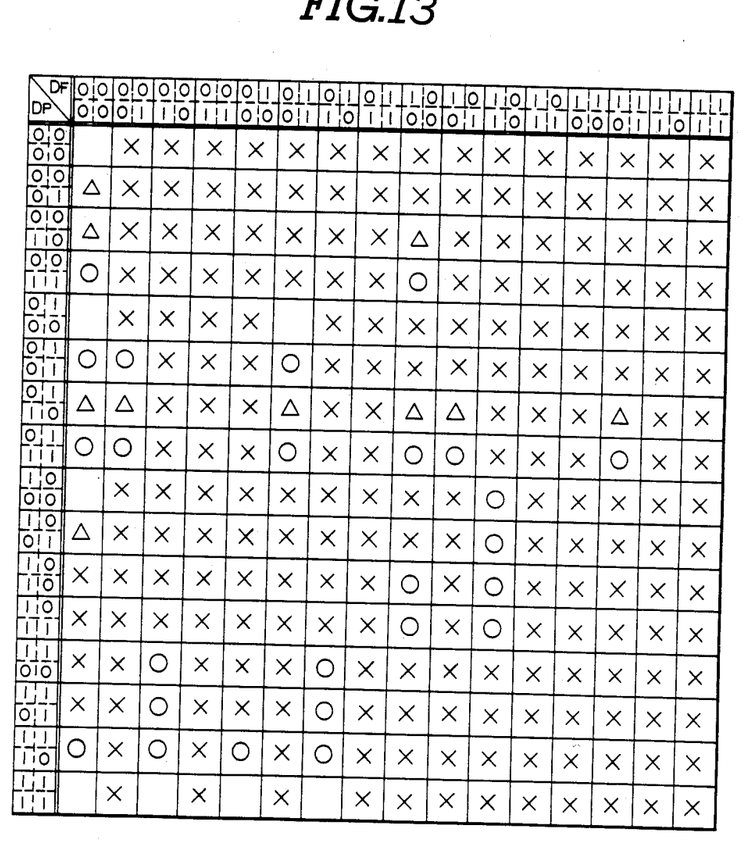
FIG. 13 is a table showing one example of the relationship programmed into the command generator circuit of FIG. 8.
Figure 14:
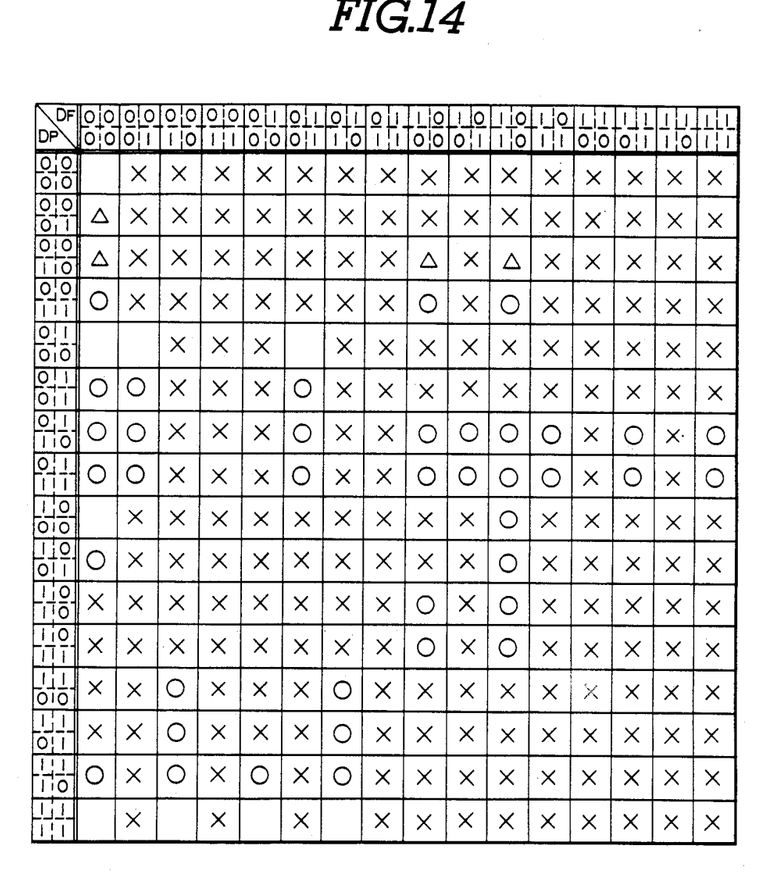
FIG. 14 is a table showing another example of the relationship programmed into the command generator circuit of FIG. 8.

FIG. 13 shows one example of the relationship programmed into the command generator circuit 48. This relationship is used to produce command data requiring the contour analyzing section 50 to connect the contour forming pixels in a 4-connectedness fashion where the last contour forming pixel is connected to a new contour forming pixel adjacent horizontally or vertically to the last contour forming pixel. FIG. 14 shows another example of the relationship programmed into the command generator circuit 48. This relationship is used to produce command data requiring the contour analyzing section 50 to connect the contour forming pixels in an 8-connectedness fashion where the last contour forming pixel is connected to a new contour forming pixel adjacent horizontally, vertically or diagonally to the last contour forming pixel. In FIGS. 13 and 14, the symbol x indicates an impossible combination. The symbol o indicates a requirement of producing command data through the data line 30b, causing the contour analyzing section 50 to perform a process to connect the contour forming pixels. The empty space indicates a requirement of producing a command signal through the signal line 30a, causing the contour analyzing section 50 to perform no process. The symbol Δ indicates the same command as indicated by the empty space. In this case, however, the command generator circuit 48 may produce command data through the data line 30b to cause the contour analyzing circuit 50 to perform a process necessary for connecting the contour forming pixels and a process necessary for run length coding.

Figure 15:
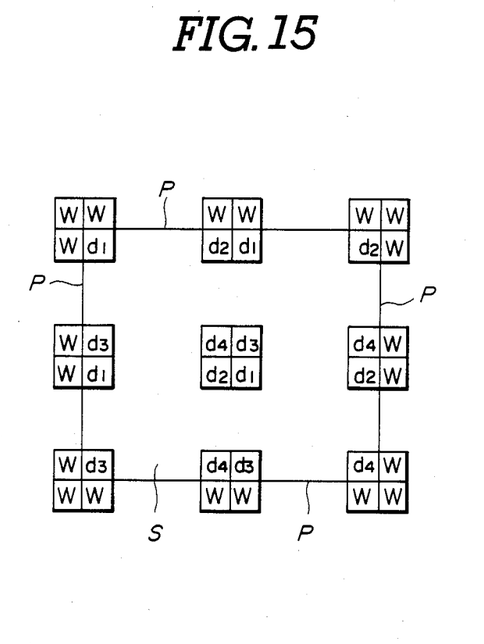
FIG. 15 is a diagram used in explaining the operation of the periphery detector circuit of FIG. 8.

Returning to FIG. 8, the numeral 38 designates a periphery detector circuit which receives address data from the address generator circuit 36 for producing a data signal to the pixel data memory 32, the flag data memory 44 and the command generator circuit 48. The data signal indicates that the pixel data matrix and/or the flag data matrix handled in the respective circuits 32, 44 and 48 is out of the periphery of the screen. These circuits 32, 44 and 48 perform a process for changing the pixel data to a value representing a white pixel when they are receives the data signal from the periphery detector circuit 38, as shown in FIG. 15.

While this invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An apparatus for detecting one or more contours of an image formed on a screen, comprising: means for raster scanning pixels located on scan lines extending in parallel with each other in the X direction of a two-dimensional coordinate system to successively produce binary pixel data regarding the scanned pixels, the binary data having a first value representing a background forming pixel or a second value representing an object forming pixel; a pixel data matrix forming circuit successively receiving the binary pixel data for forming a pixel data matrix stored therein, the pixel data matrix including pixel data regarding two adjacent pixels located on a scan line and two adjacent pixels located on the next scan line, the latter two adjacent pixels being respectively adjacent to the former two adjacent pixels in the Y direction of the two-dimensional coordinate system; and a processing circuit receiving the pixel data matrix transferred from the pixel data matrix forming circuit for producing data indicating the image contour(s), the processing circuit includes:

a flag data matrix forming circuit successively receiving binary front flag data and binary rear flag data for forming a flag data matrix stored therein, the flag data matrix including front flag data regarding the former two adjacent pixels and rear flag data regarding the latter two adjacent pixels, the front binary data having a first value representing a decided connection of the corresponding pixel to a following contour forming pixel or a second value representing an undecided connection of the corresponding pixel to a following contour forming pixel, the rear flag data having a first value representing a decided connection of the corresponding pixel to a preceding contour forming pixel and a second value representing an undecided connection of the corresponding pixel to a preceding contour forming pixel;

a flag updating circuit receiving the pixel data matrix transferred thereto from the pixel data matrix forming circuit and the flag data matrix transferred thereto from the flag data forming circuit for detecting preceding and new contour forming pixels included in the transferred pixel data matrix, the flag updating circuit including means for deciding a connection of the preceding contour forming pixel to the new contour forming pixel, the flag updating circuit including means for updating the flag data matrix according to the decided connection, the flag updating circuit including means for transferring the updated flag data matrix to the flag data matrix forming circuit;

a command generating circuit receiving the pixel data matrix transferred thereto from the pixel data matrix forming circuit and the flag data matrix transferred thereto from the flag data matrix forming circuit for producing command data, the command generating circuit having a relationship programmed thereinto, the relationship defining the command data as a function of pixel data matrix and flag data matrix; and means responsive to the command data transferred thereto from the command generating circuit for providing one or more sequences of contour forming pixels.

2. The apparatus as claimed in claim 1, wherein the flag updating circuit includes means for newly generating a preceding contour forming pixel when the transferred pixel data matrix contains no preceding contour forming pixel.

3. An apparatus for detecting one or more contours of an image formed on a screen, comprising: means for raster scanning pixels located on scan lines extending in parallel with each other in the X direction of a two-dimensional coordinate system to successively produce binary pixel data regarding the scanned pixels, the binary data having a first value representing a background forming pixel or a second value representing an object forming pixel; a pixel data matrix forming circuit successively receiving the binary pixel data for forming a pixel data matrix stored therein, the pixel data matrix including pixel data regarding two adjacent pixels located on a scan line and two adjacent pixels located on the next scan line, the latter two adjacent pixels being respectively adjacent to the former two adjacent pixels in the Y direction of the two-dimensional coordinate system; and a processing circuit receiving the pixel data matrix transferred from the pixel data matrix forming circuit for producing data indicating the image contour(s), the processing circuit includes:

a decision circuit responsive to the pixel data matrix transferred thereto from the pixel data forming circuit for producing an output data matrix, the output data matrix being the same as the transferred pixel data matrix when the transferred pixel data matrix is a 4-connectedness pixel data matrix, the output data matrix having output data each having the first value when the transferred pixel data matrix is not a 4-connectedness pixel data matrix; and an editing circuit receiving the output data matrix transferred thereto from the decision circuit for producing contour pixel data having the output data arranged in the order where the respective pixels are scanned.

4. The apparatus as claimed in claim 3, wherein the pixel data matrix forming circuit includes a shift register matrix including a first bank having front and rear shift registers connected in series and a second bank having front and rear shift registers connected in series, the front shift register of the first band has an input coupled to the binary pixel data, the front shift register of the second band has an input coupled to the binary pixel data through a 1H delay circuit.

5. The apparatus as claimed in claim 3, wherein the editing circuit includes a shift register matrix including a first bank having front and rear shift register connected in series and a second bank having front and rear shift registers connected in series, the front shift register of the second bank having an input, the rear shift register of the first bank having an output connected to the input of the front shift register of the second bank through a 1H delay circuit, the rear shift register of the second band having an output for producing the contour pixel data.

6. An apparatus for detecting one or more contours of an image formed on a screen, comprising: means for raster scanning pixels located on scan lines extending in parallel with each other in the X direction of a two-dimensional coordinate system to successively produced binary pixel data regarding the scanned pixels, the binary data having a first value representing a background forming pixel or a second value representation an object forming pixel: a pixel data matrix forming circuit successively receiving the binary pixel data for forming a pixel data matrix stored therein, the pixel data matrix including pixel data regarding two adjacent pixels located on a scan line and two adjacent pixels located on the next scan line, the latter two adjacent pixels being respectively adjacent to the former two adjacent pixels in the Y direction of the two-dimensional coordinate system: and a processing circuit receiving the pixel data matrix transferred from the pixel data matrix forming circuit for producing data indicating the image contour(s), the processing circuit includes:

a decision circuit responsive to the pixel data matrix transferred thereto from the pixel data forming circuit for producing an output data matrix, the output data matrix being the same as the transferred pixel data matrix when the transferred pixel data matrix is an 8-connectedness pixel data matrix, the output data matrix having output data each having the first value when the transferred pixel data matrix is not an 8-connectedness pixel data matrix; and an editing circuit receiving the output data matrix transferred thereto from the decision circit for producing contour pixel data having the output data arranged in the order where the respective pixels are scanned.

7. The apparatus as claimed in claim 6, wherein the pixel data matrix forming circuit includes a shift register matrix including a first bank having front and rear shift registers connected in series and a second bank having front and rear shift registers connected in series, the front shift register of the first bank has an input coupled to the binary pixel data, the front shift register of the second band has an input coupled to the binary pixel data through a 1H delay circuit.

8. The apparatus as claimed in claim 6, wherein the editing circuit includes a shift register matrix including a first bank having front and rear shift register connected in series and a second bank having front and rear shift registers connected in series, the front shift register of the second band having an input, the rear shift register of the first bank having an output connected to the input of the front shift register of the second bank through a 1H delay circuit, the rear shift register of the second band having an output for producing the contour pixel data.

* * * * *